United States Patent
Park

(10) Patent No.: US 6,603,754 B1
(45) Date of Patent: Aug. 5, 2003

(54) BASESTATION TRANSMISSION SYSTEM IN MOBILE COMMUNICATION SYSTEM AND METHOD FOR PROCESSING BASEBAND SIGNAL USING THE SAME

(75) Inventor: Won Hyoung Park, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/210,782

(22) Filed: Dec. 15, 1998

(30) Foreign Application Priority Data

Dec. 20, 1997 (KR) .............................................. 97-71345

(51) Int. Cl.[7] .............................................. H04B 7/216
(52) U.S. Cl. ........................................ 370/342; 370/441
(58) Field of Search ................................. 370/208, 209, 370/210, 335, 342, 441, 435, 536, 542, 543, 544, 529, 329, 344, 465, 466; 375/130, 140, 146, 144, 148, 240, 235, 229, 222, 220, 225, 298, 256; 379/202; 341/50

(56) References Cited

U.S. PATENT DOCUMENTS 5,406,629 A * 4/1995 Harrison et al. ............ 370/209
6,172,994 B1 * 1/2001 Schaffner et al. ........... 370/542
6,333,926 B1 * 12/2001 Van Heeswyk et al. ..... 370/320

* cited by examiner

*Primary Examiner*—Dang Ton
(74) *Attorney, Agent, or Firm*—Fleshner & Kim, LLP

(57) ABSTRACT

Base station transmission system in a CDMA mobile communication system and a method for processing a baseband signal using the same, which can provide a baseband signal less susceptible to noise and up to 16 communication channels in one channel card, the system including a channel card unit for band spread modulating a received voice signal into a baseband signal and transmitting in series, a digital combining unit for collecting the baseband signals from the channel card unit separate for preset channels, accumulating the baseband signals, and separating the baseband signals for preset channels, a digital/analog converting unit for converting the serial baseband signal from the digital combining part into a parallel signal and then converting into an analog signal, and a baseband transmission processing unit for processing the baseband signal from the digital/analog converting unit to meet the radio signal recommendations, wherein the channel card unit and the digital combining unit are integrated on a PCB and the digital/analog converting unit and the baseband transmission unit are also integrated on a PCB.

22 Claims, 3 Drawing Sheets

BASESTATION TRANSMISSION SYSTEM IN MOBILE COMMUNICATION SYSTEM AND METHOD FOR PROCESSING BASEBAND SIGNAL USING THE SAME

BACKGROUND OF THE INVENTION

1. Field of the Invention

The present invention is related to a base station transmission system in a mobile communication system, and more particularly, to a base station transmission system in a CDMA (Code Division Multiple Access) mobile communication system and a method for processing a baseband signal using the same, which can provides a baseband signal less susceptible to noise and maximize a channel capacity.

2. Background of the Related Art

In general, in the mobile communication system, there are transmission or reception signal of baseband, intermediate frequency band, and radio frequency band depending on a frequency band of the signal. The baseband is a frequency band occupied by an original information signal before modulation. Therefore, the baseband is a frequency band of which lowest frequency is near to 0 or containing a direct current component. The intermediate frequency band is a frequency band to which a baseband frequency to be transmitted to outside of the station is increased by adding a local oscillator frequency in a frequency converter in a base station and, opposite to this, to which a radio frequency received from outside of the station is decreased by subtracting the local oscillator frequency in the frequency converter. The radio frequency band is a frequency band for use in radio communications within an electromagnetic spectrum range from 10 KHz to 300 GHz.

FIG. 1 illustrates a block diagram showing a related art basestation transmission system in a CDMA mobile communication system.

Referring to FIG. 1, the related art basestation transmission system in a CDMA mobile communication system is provided with a channel card unit 1, a buffer unit 2, and a baseband signal processing unit 3, each of which has a PCB form. The channel card unit 1 is provided with four CDMA modem 11~14, each having a CDMA basestation modem unit 10 for band spreading a received digital voice signal according to a CDMA recommendations(for example, IS-95 family), a digital combining unit 20a or 20b for combining digital signals from the CDMA basestation modem unit 10 transmitted through alpha, beta, gamma paths, a digital/analog converting unit 30a or 30b for converting the digital signal from the digital combining unit 20a or 20b into an analog signal, a low pass filter 40a and 40b for removing unnecessary frequency band in view of a signal characteristic from the signal from the digital/analog converter 30a or 30b, and an amplifier 50a or 50b for amplifying a signal from the low pass filter 40a or 40b to a required level. The buffer unit 2 is provided with amplifiers 61~66 equal to the channel card units 1 in number, each for separating analog signals provided through I, and Q channels from the amplifier 50a or 50b into sectors of alpha, beta, and gamma. The baseband signal processing unit 3 is provided with accumulators 70a~70f each for accumulating an analog signal from the buffer amplifier 61~66, phase equalizers 80a~80f each for regulating a phase characteristic of a signal from the accumulator 70a~70f to suit to a CDMA signal characteristic, low pass filters 90a~90f each for removing an unnecessary frequency band from a signal from the phase equalizer 80a~80f to satisfy a cut offset characteristic, and intermediate amplifiers 100a~100f each for receiving a signal from the low pass filter 90a~90f and amplifying to a required level for easy modulation in I & Q modulation type(one of QPSK modulation type). The back planes 110a and 110b in FIG. 1 denote unitary PCBs, which is one of transmission mediums used in place of cable in data transmission between the channel card unit 1, the buffer unit 2 and the baseband signal processing unit 3, each in a PCB form, in the basestation transmission system. As shown in FIG. 1, output terminals on the channel card unit 1 are connected to the back plane 110a, and output terminals on the buffer unit 2 are connected to the back plane 110b.

The operation of the related art basestation transmission system in a CDMA mobile communication system will be explained.

A voice signal encoded in a vocoder is provided to one of the CDMA modem 11~14 in the voice channel card unit 1 as an 8 bit data bus. Each of the CDMA modems 11~14, two or four are provided on one board, provides one communication channel. In the related art, the CDMA modem 11 or 14 spreads a voice signal into a digital baseband signal of 1.2288 Mcps, selects I or Q channel, and provides to the digital combining unit 20a or 20b at up to 9600 bps through three channels of alpha, beta, gamma. The digital combining unit 20a or 20b receives the baseband signal split into three alpha, beta, and gamma paths for each of the I and Q channels from one CDMA modem 11 and 14, subjects to digital combining, and provides to the digital/analog converter 30a or 30b in 10 bit units. Then, the digital/analog converter 30a or 30b converts the received digital signal into an analog signal suitable for radio transmission. The low pass filter 40a or 40b removes unnecessary bands in view of a signal characteristic from the analog signal of 1.2288 MHz from the digital/analog converter 30a or 30b. The amplifier 50a or 50b provides the analog signal from the low pass filter 40 or 40b to the buffer amplifier 61~66 in the buffer unit 2 separate for three alpha, beta, and gamma paths for each of the I and Q channels through the back plane 110a. The buffer amplifier 61~66 in the buffer unit 2 provides the analog signal to the baseband signal processing unit 3 separate for three alpha, beta, and gamma paths for each of the I and Q channels through the back plane 110b. Each of the accumulators 70a~70f in the baseband signal processing unit 3 accumulates the analog signal from the buffer amplifier 61~66 and provides to the phase equalizer 80a~80f Each of the phase equalizers 80a~80f adjusts a phase characteristic of a signal from the accumulator 70a~70f to suit to a CDMA signal characteristic and provides to the low pass filter 90a~90f. The low pass filter 90a~90f removes unnecessary bands from the phase adjusted CDMA baseband signal to satisfy a cut offset characteristic and provides to the intermediate amplifier 110a~100f. The intermediate amplifier 100a~100f amplifies the CDMA baseband signal, and then converted into a radio frequency for transmission, and transmitted through a basestation antenna.

However, in the related art CDMA basestation transmission system, the baseband signal is susceptible to noise during the baseband signal provided from the buffer unit 2 through the back plane 100b is accumulated in the accumulator in the baseband signal processing unit 3. This is because the baseband signal provided through the back plane 110b is an analog signal susceptible to noise. The demerit significantly affects a forward capacity of the system, which can be a great cause of a communication quality degradation when the communication is busy. That is, the related art basestation transmission system has a limit in improvement of a communication quality through improvement of a baseband signal characteristic improvement.

A maximum number of the CDMA modems 11~14 mountable on the channel card unit 1 is four under the present level of a basestation transmission system supporting technique. The basestation transmission system of the Qualcomm in U.S.A. can supports 2 CDMA modems, and the STAREX-CMX of the LG Information and Communication, Ltd. can supports 4 CDMA modems. As one CDMA modem provides on communication channel, the basestation transmission system with the channel card unit, the buffer unit, and the baseband signal processing unit shown in FIG. 1 should be kept extended for an increased transmission rate of the baseband signal. However, the extension results in a complicated structure and connection of entire transmission system, and causes many problems in operation and power control of the transmission system.

SUMMARY OF THE INVENTION

Accordingly, the present invention is directed to a base station transmission system in a CDMA mobile communication system and a method for processing a baseband signal using the same that substantially obviates one or more of the problems due to limitations and disadvantages of the related art.

An object of the present invention is to provide a base station transmission system in a CDMA mobile communication system and a method for processing a baseband signal using the same, in which a baseband signal is processed to be less susceptible to noise for improving a communication quality.

Another object of the present invention is to provide a base station transmission system in a CDMA mobile communication system which can extend communication channels provided to one channel card up to 16.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the base station transmission system in a CDMA mobile communication system includes a channel card unit for band spread modulating a received voice signal into a baseband signal and transmitting in series, a digital combining unit for collecting the baseband signals from the channel card unit separate for preset channels, accumulating the baseband signals, and separating the baseband signals for preset channels, a digital/analog converting unit for converting the serial baseband signal from the digital combining part into a parallel signal and then converting into an analog signal, and a baseband transmission processing unit for processing the baseband signal from the digital/analog converting unit to meet the radio signal recommendations, wherein the channel card unit and the digital combining unit are integrated on a PCB and the digital/analog converting unit and the baseband transmission unit are also integrated on a PCB.

In another aspect of the present invention, there is provided a method for processing a baseband signal using a basestation transmission system in a mobile communication system, including the steps of (1) band spread modulating a received voice signal into a baseband signal and transmitting in series, (2) collecting the baseband signals transmitted in series separate for preset channels, accumulating the baseband signals, separating the baseband signals for preset channels again, and transmitting the baseband signals in series, (3) converting the transmitted serial baseband signal into a parallel signal and then into an analog signal, and (4) processing the analog baseband signal to meet the radio signal recommendations.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
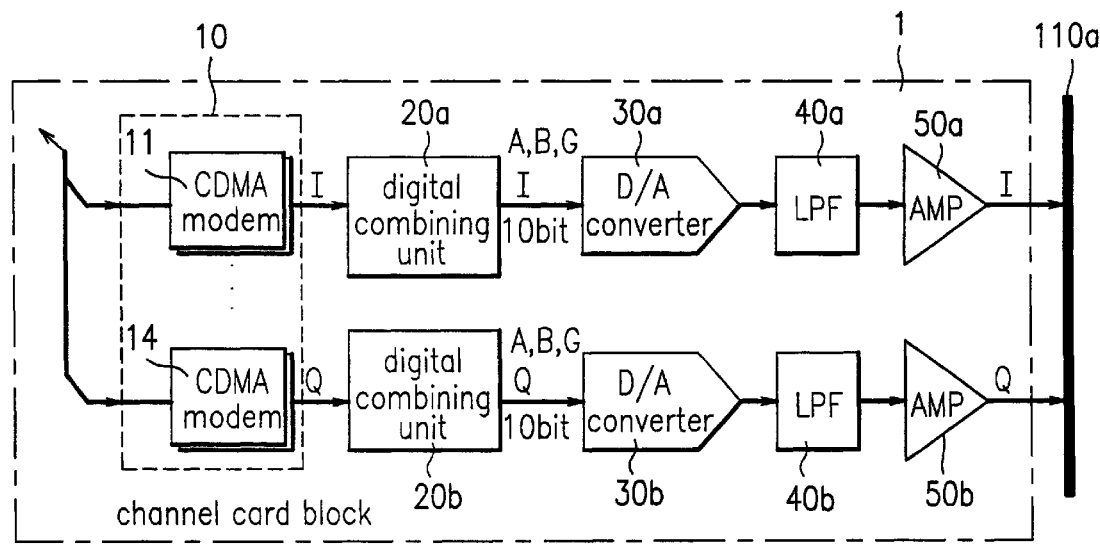
FIG. 1 illustrates a block diagram showing a related art basestation transmission system in a CDMA mobile communication system.
Figure 1:
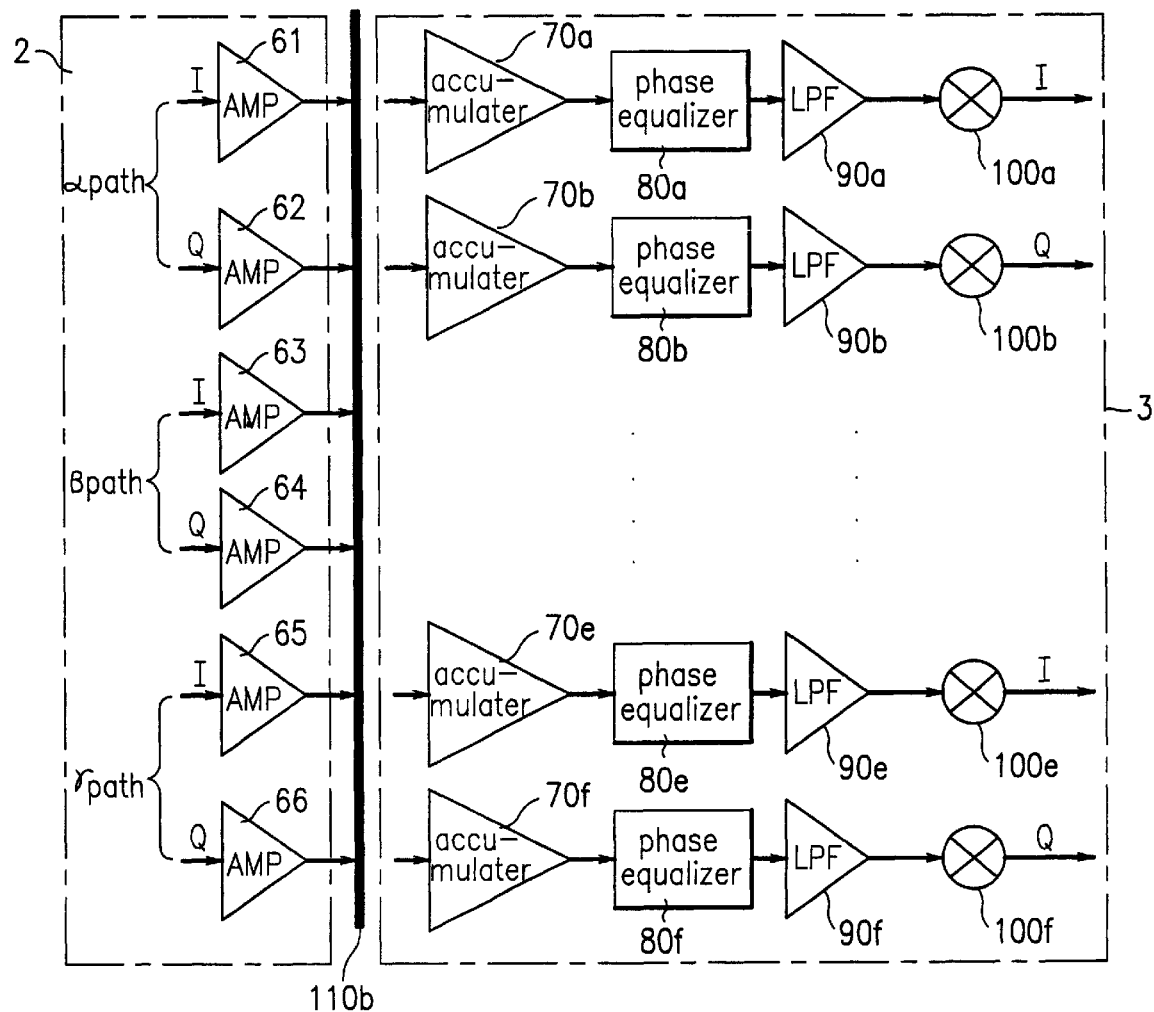
Figure 2:
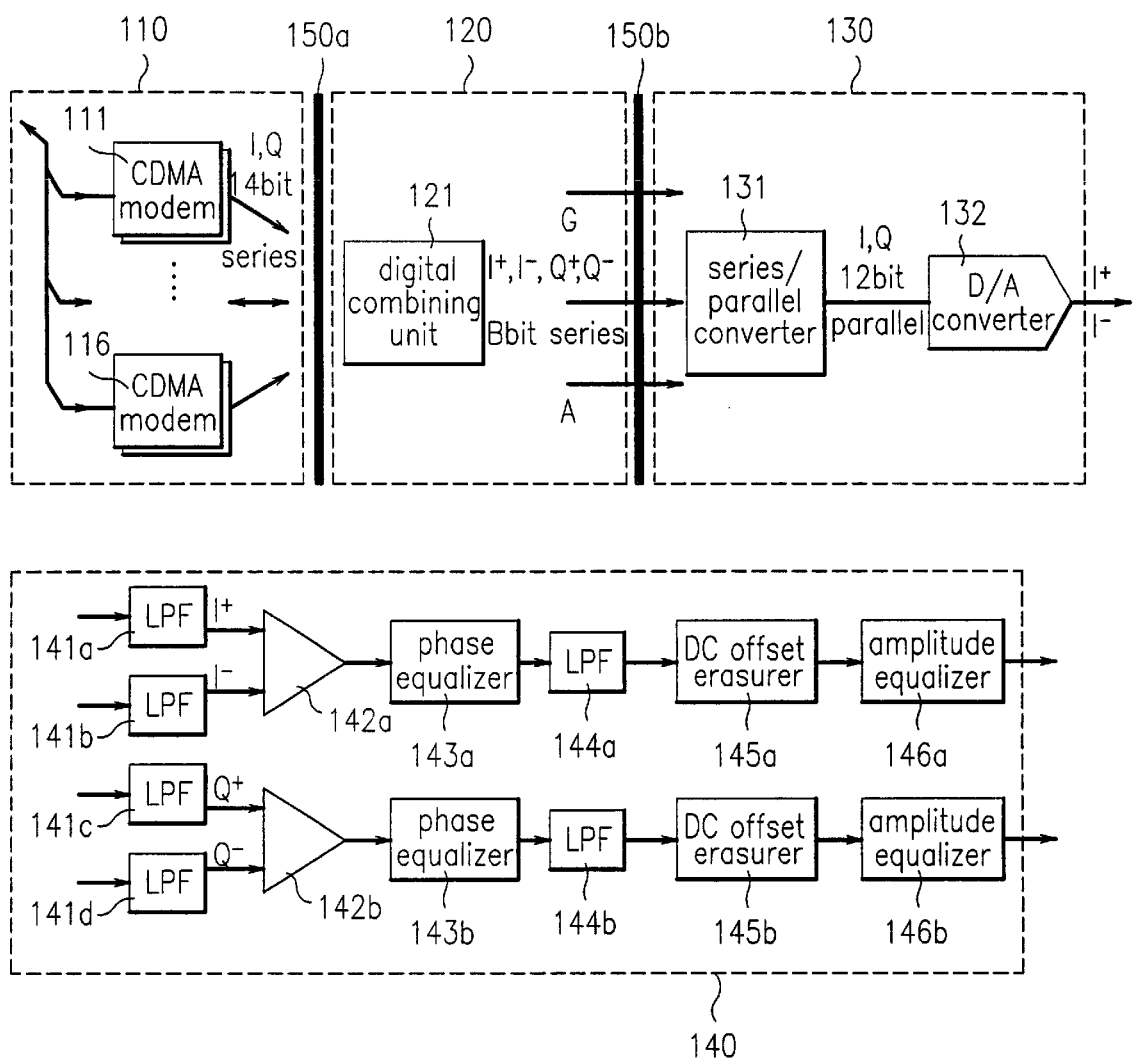
FIG. 2 illustrates a block diagram showing a basestation transmission system in a CDMA mobile communication system in accordance with a preferred embodiment of the present invention; and, FIGS. 3 and 4 respectively illustrate systems of the phase equalizer and the amplitude equalizer shown in FIG. 2.

Reference will now be made in detail to the preferred embodiments of the present invention, examples of which are illustrated in the accompanying drawings. FIG. 2 illustrates a block diagram showing a basestation transmission system in a CDMA mobile communication system in accordance with a preferred embodiment of the present invention.

Referring to FIG. 2, the basestation transmission system in a CDMA mobile communication system in accordance with a preferred embodiment of the present invention includes a channel card unit 110 having 16 CDMA modules 111~116 for band spread modulating a received voice signal into a digital baseband signal and transmitting in series, a digital combining unit 120 for collecting each of the signals transmitted through the CDMA modules 111~116 in the channel card unit 110 channel by channel, accumulating the signal in a digital form, and providing the signal channel by channel, a digital/analog converting unit 130 for converting the signal provided in series from the digital combining part 120 into a parallel signal and then converting into an analog signal, and a baseband transmission processing unit 140 for controlling a cutoff characteristic of a signal from the digital/analog converting unit 130 so that the signal from the digital/analog converting unit 130 meets the radio signal recommendations. The channel card unit 110 and the digital combining unit 120 are integrated on a PCB and the digital/analog converting unit 130 and the baseband transmission unit 140 are also integrated on a PCB, for processing a signal in a manner which is less susceptible to noise by processing the analog baseband signal in a circuit of PCB and providing digital baseband signals to all back planes. The digital/analog converting unit 130 includes a series/parallel converter 131 for converting a series signal into a parallel signal, and a digital/analog converter 132 for converting a signal from the series/parallel converter 131 into digital/analog converting. The baseband transmission processing unit 140 includes low pass filters 141a~141d for receiving signals separate for channels I+, I−, Q+, Q− and removing harmonics, high frequency noises, contained in the signals, differential amplifiers 142a and 142b each for removing a dc offset from each of two signals from the low pass filters 141a~141d, phase equalizers 143a and 143b each for providing a linear phase characteristic to a baseband signal from the differential amplifier 142a or 142b to suit to a CDMA wave environment and a mobile telephone characteristic, low pass filters 144a and 144b each for removing unnecessary bands from the baseband signal from the phase equalizer 143a or 143b, dc offset erasures 145a and 145b each for removing an unnecessary dc component from the baseband signal from the low pass filter 144a or 144b, and amplitude equalizers 146a and 146b each for amplifying the baseband signal from the dc offset erasure 145a or 145b to a required level for easy modulation by a QPSK (Quadrature Phase Shifting Keying) method and obtaining a flat signal at 1.2288 MHz band. In this instance, the back planes 150a and 150b are unitary PCB's, the channel card unit 110 has an output terminal connected to the back plane 150a, and the digital combining unit 120 has an output terminal connected to the back plane 150b.

The operation of the aforementioned CDMA basestation transmission system in accordance with a preferred embodiment of the present invention will be explained.

Figure 3:
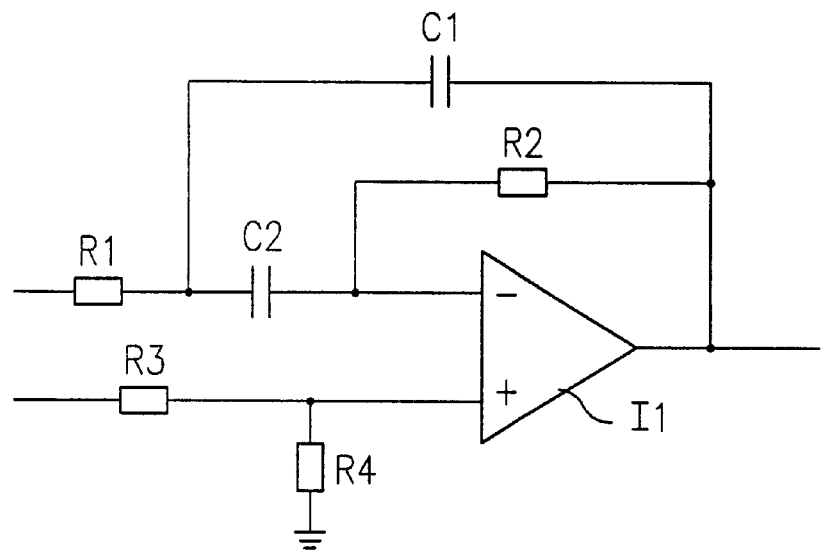

The voice signal encoded in a vocoder is applied to one of the CDMA modems 111~116 in the voice channel card unit 110 in 8 bit data buses. The digital voice signal provided to one of the CDMA modems 111~116 is spread modulated into a digital baseband signal of 1.2288 Mcps to suit to CDMA signal recommendations(an IS-95 family), and provided to the digital combining unit 121 in three paths of alpha, beta, and gamma by 16 bits in series. A signal from the channel card unit 110 is a digital signal, which is provided to the digital combining unit 121 through the back plane 150a. It should be noted that the signal passed through the back plane 150a is a digital signal, which is less susceptible to noise compared to an analog signal. The digital combining unit 121 receives a CDMA signal which is a signal that four CDMA modems in each channel card unit are gathered into one group, subjects to digital accumulation for each sector of alpha, beta, and gamma, separates into I+, and I−channels and Q+, and Q−channels, and provides to the series/parallel converter 131 in the digital/analog converter 130 in 16 bit units in series. The series/parallel converter 131 converts the 16 bit series signal from the digital combining unit 121 into 12 bit parallel signal, and the digital/analog converter 132 converts the digital signal from the series/parallel converter 131 into analog signal. The analog signal from the digital/analog converter 132 is removed of unnecessary frequency bands as the analog signal passes through the low pass filter 141a~141d. That is, the low pass filter 141a~141d receives an analog signal and removes harmonics which are one kind of high frequency component contained in the analog signal. As shown in FIG. 2, the baseband signal from the low pass filter 141a~141d, having the harmonics removed therefrom is removed of a dc offset through the differential amplifier 142a or 142b. The baseband signal from the differential amplifier 142a or 142b is given a linear phase characteristic to suit to a CDMA wave environment and a mobile telephone characteristic as the baseband signal passes through the phase equalizer 143a or 143b. A circuit representing the phase equalizer 143a or 143b is shown in FIG. 3. And, in this instance, a transmission function can be expressed in equation shown below.

$$T(s) = \frac{-(\omega_0/Q)s}{s^2 + (\omega_0/Q)s + \omega_0^2},$$

Where, $\omega_0 = \frac{1}{C\sqrt{R1R2}}$, $Q = \frac{1}{2}\sqrt{\frac{R2}{R1}}$, $Q = 0.76$, and $\omega_0 = 2\pi \cdot 297000$.

Figure 4:
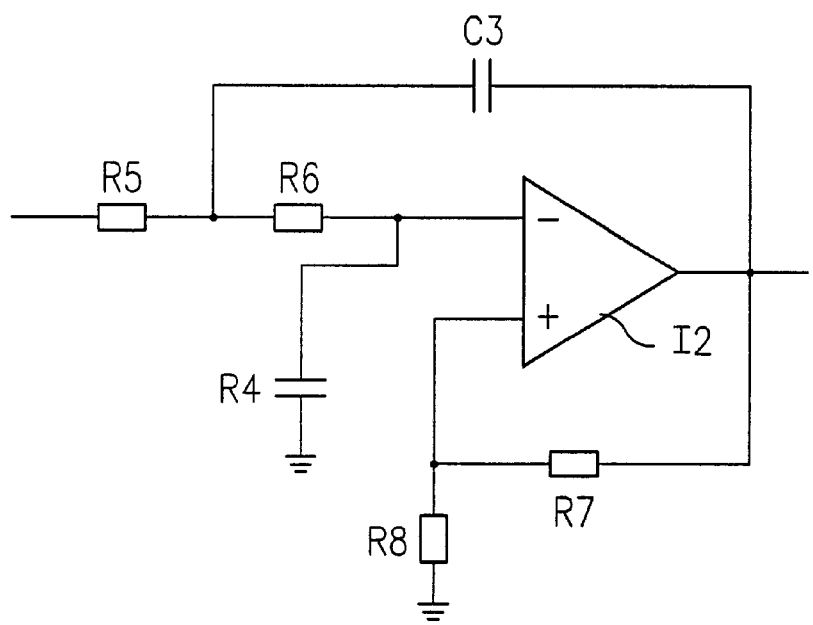

The baseband signal from the phase equalizer 143a or 143b obtains a cutoff characteristic satisfying CDMA radio recommendations as the baseband signal passes through the low pass filter 144a or 144b, and, then, is removed of unnecessary dc components as the baseband signal passes through the dc offset erasure 145a or 145b. The baseband signal from the dc offset erasure 145a or 145b is amplified to a required level for easy QPSK modulation as the baseband signal passes through the amplitude equalizer 146a or 146b, with a quality factor adjusted to have an improved flatness at 1.2288 MHz band. A circuit of the amplitude equalizer 146a or 146b of this case is shown in FIG. 4. A transmission function of this case can be expressed as below.

$$T(s) = \frac{K\omega_0^2}{s^2 + (\omega_0/Q)s + \omega_0^2},$$

Where, $K = 2$, $Q = \frac{1}{3-K}$, and $\omega_0 = 2 \cdot \pi \cdot 1 \cdot 10^6$ The base station transmission system in a CDMA mobile communication system and the method for processing a baseband signal using the same of the present invention is advantageous in improving a communication quality as all the baseband signal provided through the back plane are digital signals which are less susceptible to noise.

And, the base station transmission system in a CDMA mobile communication system and a method for processing a baseband signal using the same of the present invention can increase a transmission rate within the same time range by providing up to 16 CDMA modem in a channel card unit for a limited basestation transmission system. Therefore, the base station transmission system in a CDMA mobile communication system and a method for processing a baseband signal using the same of the present invention requires no extension of the basestation transmission system with the channel card unit, the buffer unit, and the baseband signal processing unit, which is continuously required in the related art for increased transmission rate within the same time range. Therefore, base station transmission system in a CDMA (Code Division Multiple Access) mobile communication system and a method for processing a baseband signal using the same of the present invention can improve a simultaneous transmission rate as well as a communication quality without changing the related art basestation transmission system much.

It will be apparent to those skilled in the art that various modifications and variations can be made in the base station transmission system in a CDMA mobile communication system and a method for processing a baseband signal using the same of the present invention without departing from the spirit or scope of the invention. Thus, it is intended that the present invention cover the modifications and variations of this invention provided they come within the scope of the appended claims and their equivalents.

What is claimed is:

1. A basestation transmission system in a mobile communication system, comprising:

a channel card unit for band spread modulating a received voice signal into a baseband signal containing I signal portions and Q signal portions for each of a plurality of sectors, and for transmitting the baseband signal in series;

a digital combining unit for combining the I and Q signals portions of the base baseband signal on a channel-by-channel basis for each of said sectors;

a digital/analog converting unit for converting the serial baseband signal output from the digital combining unit into a parallel signal, and then converting the parallel signal into an analog signal; and a baseband signal processing unit for processing the analog baseband signal from the digital/analog converting unit, wherein the channel card unit and the digital combining unit are integrated on a printed circuit board and the digital/analog converting unit and the baseband transmission unit are also integrated on a printed circuit board.

2. A basestation transmission system as claimed in claim 1, wherein the channel card unit provides at least 16 communication channels.

3. A basestation transmission system as claimed in claim 1, wherein the digital combining unit separates the I signal portion into I$^+$ and I$^-$ signal portions and the Q signal portion into Q$^+$ and Q$^-$ signal portions.

4. A basestation transmission system as claimed in claim 1, wherein an output terminal on the channel card unit is connected to a back plane of the PCB on which the digital combining unit is mounted, and wherein an output terminal on the digital combining unit is connected to a back plane of the PCB on which the digital/analog converting unit is mounted.

5. A basestation transmission system as claimed in claim 1, wherein the digital/analog converting unit includes:

a series/parallel converting for converting the serial baseband signal output from the digital combining unit into a parallel signal, and a digital/analog converter for converting the parallel signal from the series/parallel converter into said analog signal.

6. A basestation transmission system in a mobile communication system, comprising:

a channel card unit for band spread modulating a received voice signal into a baseband signal and transmitting the baseband signal in series;

a digital combining unit for combining the baseband signal output from the channel card unit on a channel-by-channel basis for each of a plurality of sectors;

a digital/analog converting unit for converting the serial baseband signal output from the digital combining unit into a parallel signal, and then converting the parallel signal into an analog signal; and a baseband signal processing unit for processing the baseband signal from the digital/analog converting unit to conform to a predetermined radio signal, wherein the channel card unit and the digital combining unit are integrated on a printed circuit board and the digital/analog converting unit and the baseband transmission unit are also integrated on a printed circuit board, and wherein the baseband signal processing unit includes:

first low pass filters each for receiving a signal from the digital/analog converting unit and removing high frequency noise contained in the signal, differential amplifiers for removing dc offsets from the signals from the first low pass filters, phase equalizers each for providing a linear phase characteristic to a baseband signal output from a respective one of the differential amplifiers, second low pass filters each for removing unnecessary bands from the baseband signal output from a respective one of the phase equalizers, dc offset erasures each for removing unnecessary dc components output from the baseband signal from a respective one of the low pass filters, and amplitude equalizers each for amplifying the baseband signal output from a respective one of the dc offset erasures to an intended level.

7. A method for processing a baseband signal using a basestation transmission system in a mobile communication system, comprising the steps of:

(1) band spread modulating a received voice signal into a baseband signal containing I signal portions and Q signal portions for each of a plurality of sectors, and for transmitting the baseband signal in series;

(2) combining the I and Q signals portions of the base baseband signal generated in step (1) on a channel-by-channel basis for each of said sectors;

(3) converting the serial baseband signal generated in step (2) into a parallel signal, and then converting the parallel signal into an analog signal; and (4) processing the analog signal to conform to a predetermined radio signal.

8. A method as claimed in claim 7, wherein, in the transmission in the step (1), up to 16 communication channels can be used on the same time.

9. A method as claimed in claim 7, wherein, in the transmission in the steps (1) and (2), a digital baseband signal is transmitted.

10. A method for processing a baseband signal using a basestation transmission system in a mobile communication system, comprising the steps of:

(1) band spread modulating a received voice signal into a baseband signal and transmitting the baseband signal in series;

(2) combining the base baseband signal generated in step (1) on a channel-by-channel basis for each of said sectors;

(3) converting the serial baseband signal generated in step (2) into a parallel signal, and then converting the parallel signal into an analog signal; and (4) processing the analog signal to conform to a predetermined radio signal, wherein the step (4) includes the steps of:

(41) removing high frequency noises contained in the signal from step (3),

(42) removing dc offsets from the signal from the step (41),

(43) removing the signal from the step (42) to be provided with a linear phase characteristic,

(44) removing unnecessary bands from the signal from the step (43),

(45) removing unnecessary dc components from the signal from the step (44), and

(46) amplifying the signal from the step (45) to an intended level.

11. A basestation transmission system as claimed in claim 1, wherein the channel card unit includes more than 4 modems.

12. A basestation transmission system as claimed in claim 11, wherein the more than 4 modems of the channel card unit are mounted on a same printed circuit board.

13. A basestation transmission system as claimed in claim 11, wherein the channel card unit includes 16 modems.

14. A method as claimed in claim 7, wherein step (2) includes:
separating the I signal portion into $I^+$ and $I^-$ signal portions and separates the Q signal portion into $Q^+$ and $Q^-$ signal portions.

15. A baseband transmission system in a mobile communication system, comprising:
a channel card unit for band spread modulating a digital voice signal into I signal portions and Q signal portions, said channel card unit including n modems connected to a single printed circuit board, where n>4;
a digital combining unit for combining the I and Q signals output from the channel card unit on a channel-by-channel basis for each of a plurality of sectors;
a digital/analog converting unit for converting a signal output from the digital combining unit into an analog signal; and
a baseband signal processing unit for processing a signal output from the digital/analog converting unit to conform to a predetermined radio signal, wherein the digital combining unit separates the I signal portion into $I^+$ and $I^-$ signal portions and the Q signal portion into $Q^+$ and $Q^-$ signal portions.

16. A baseband transmission system as claimed in claim 15, wherein the digital combining unit is formed on a first printed circuit board and the digital/analog converting unit is formed on a second printed circuit board.

17. A baseband transmission system as claimed in claim 15, wherein n=16.

18. A baseband transmission system as claimed in claim 15, wherein the digital combining unit separates the I signal portion into $I^+$ and $I^-$ signal portions and the Q signal portion into $Q^+$ and $Q^-$ signal portions.

19. A baseband transmission system as claimed in claim 15, wherein the channel card unit band spread modulates the digital voice signal into a baseband signal containing I signal portions and Q signal portions for each of said plurality of sectors.

20. A baseband transmission system as claimed in claim 15, wherein the digital combining unit combines I and Q signals portions of the base baseband signal output from the channel card unit on a channel-by-channel basis for each of said plurality of sectors.

21. A basestation transmission system as claimed in claim 1, wherein the digital combining unit collects the I and Q signal portions output from the channel card unit, accumulates the I and Q signal portions, and separates the accumulated signal portions for preset channels.

22. A basestation transmission system as claimed in claim 1, wherein the baseband signal processing unit processes the analog baseband signal from the digital/analog converting unit to conform to a predetermined radio signal.

* * * * *